United States Patent
Davies

[11] 3,910,104
[45] Oct. 7, 1975

[54] APPARATUS AND METHOD FOR ULTRASONIC TESTING
[75] Inventor: David Harris Davies, Guisborough, England
[73] Assignee: British Steel Corporation, London, England
[22] Filed: Sept. 4, 1974
[21] Appl. No.: 502,916

[30] Foreign Application Priority Data
Sept. 7, 1973 United Kingdom............... 42441/73

[52] U.S. Cl. ............................................. 73/67.8 S
[51] Int. Cl.² ......................................... G01N 29/04
[58] Field of Search........... 340/1 R, 5 R; 73/67.8 S, 73/71.5 US

[56] References Cited
UNITED STATES PATENTS
3,631,714  1/1972  Cressman et al. ................. 73/67.8 S
3,850,027  11/1974  Nakanishi et al................. 73/67.8 S

*Primary Examiner*—Richard A. Farley
*Attorney, Agent, or Firm*—Bacon & Thomas

[57] ABSTRACT

A steel plate or other test piece can be ultrasonically tested using water as a coupling medium by passing the plate past or through a water reservoir which is, if necessary, continuously supplied with additional water to maintain contact with the plate, the reservoir containing a buoyant beam carrying an array of ultrasonic transducers directed towards the plate, means being provided to reciprocate the beam to give a plurality of zigzag ultrasonic inspection paths. Reciprocation of the beam increases the area scanned and the particular apparatus allows a light yet rigid beam to be rapidly reciprocated.

11 Claims, 3 Drawing Figures

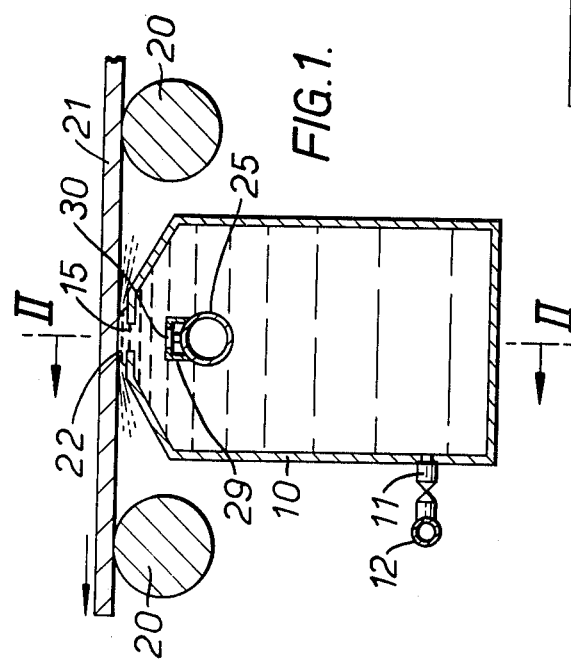
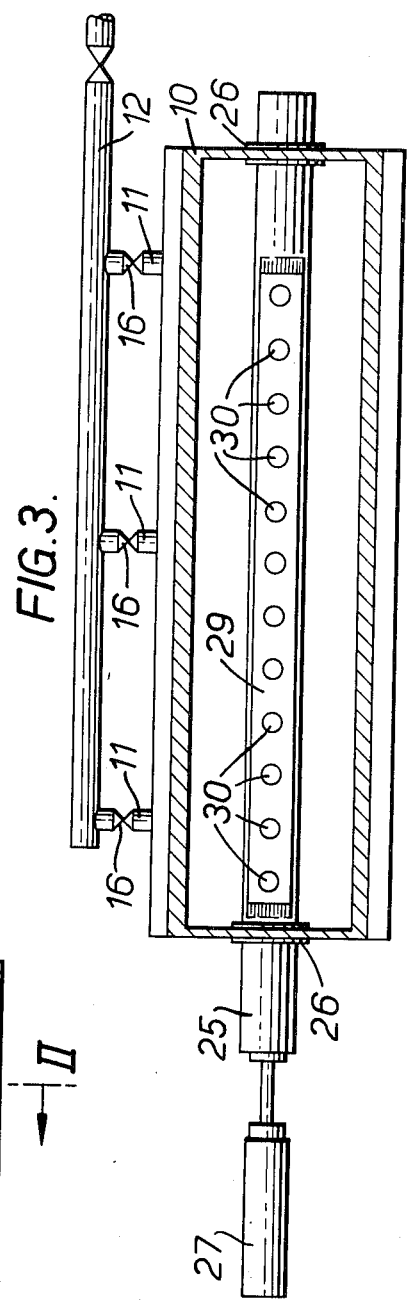

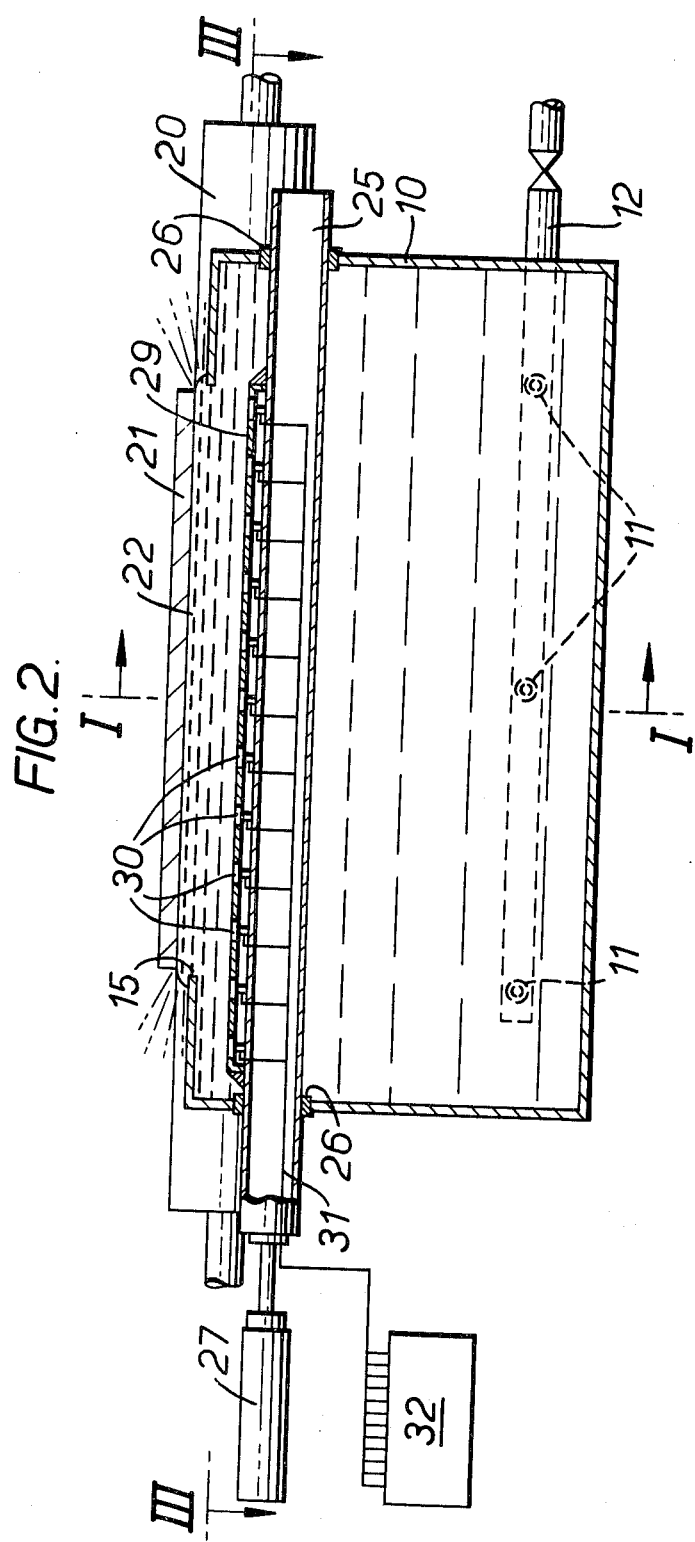

APPARATUS AND METHOD FOR ULTRASONIC TESTING

This invention relates to an apparatus and a method for ultrasonic testing. It is particularly intended for use with the pulse-echo technique for detecting defects in metal test pieces, especially steel products.

According to the invention there is provided apparatus for ultrasonically testing a test piece utilising water as a coupling medium between ultrasonic transducers and a test piece moving relative to the testing apparatus along a predetermined pathway, which apparatus comprises guide means defining the pathway to be followed by the test piece, a reservoir for the water so arranged in relation to the pathway that the water can contact successive parts of the test piece to be tested, a beam in the reservoir mounted for axial reciprocation transversely of the pathway, and a plurality of ultrasonic transducers carried spaced along the beam operatively directed towards the pathway, the beam and the ultrasonic transducers carried thereon having in combination substantially neutral or positive buoyancy in water.

The invention also provides a method for ultrasonically testing a test piece, which method comprises moving the test piece relatively to a reservoir of water along a predetermined pathway whereby water from the reservoir contacts successive parts of the test piece to be tested, axially reciprocating in the reservoir a beam carrying a plurality of ultrasonic transducers spaced along the beam operatively directed towards the pathway, the beam and the ultrasonic transducers carried thereon having in combination substantially neutral or positive buoyancy in the water, and activating the ultrasonic transducers whereby to transmit ultrasonic energy to the test piece and receive ultrasonic energy reflected from the test piece through the water as a coupling medium.

In a preferred form of the invention the pathway is disposed outside the reservoir which is provided with an elongate outlet disposed transversely of the pathway, and the reservoir is further provided with means for the continuous supply to it of water, whereby a continuous flow of water emerging from the outlet can intersect the pathway and contact the test piece when it is moving along the pathway.

One embodiment of the invention is illustrated in the accompanying diagrammatic drawings, in which:

FIG. 1 is a sectional end view of apparatus for ultrasonically testing a rolled steel plate, taken on the line I — I of FIG. 2;

FIG. 2 is a sectional side view of the apparatus, taken on the line II — II of FIG. 1; and FIG. 3 is a sectional plan view of the apparatus, taken on the line III — III of FIG. 2.

In the drawings, a tank 10 has three inlets 11 continuously supplied with water from a pipe 12. The tank has a longitudinal slot 15 in its top through which water wells up before draining away down the outside of the tank, after which it can be collected and recycled, after filtration if necessary, to the supply pipe 12. The inlets 11 are spaced along the tank and are controlled by individual valves 16 to give an approximately even flow of water along the length of the slot 15.

The tank is situated between two rollers 20 of a roller table along which steel plates can be driven. A plate 21 is shown travelling across these two rollers. The top of the tank containing the slot 15 is just below the lower face of the plate as it passes, and sufficiently close that the water welling up from the slot 15 contacts the plate across as its whole width in a continuously replenished pool 22.

Directly under the slot 15 and parallel with it the tank 10 carries a beam in the form of a stainless steel tube 25 which extends through opposite ends of the tank through water seals 26 which permit the tube 25 to slide axially. A pneumatic piston and cylinder 27 is connected to one end of the tube and is arranged to reciprocate the tube in the tank.

Along the top of the tube 25 is affixed an external duct 29 carrying an array of ultrasonic transducers 30 directed through the slot 15. The length of the array of the transducers is greater than the width of the plate by an amount which is sufficient to ensure that at the extreme positions of the tube 25 during its axial reciprocation neither edge of the plate overreaches either end of the array of transducers. The relative positions and orientations of the transducers 30, the slot 15 and the plate 21 are such that ultrasonic energy pulses emitted by each transducer are reflected back to the same transducer from the plate.

The transducers 30 are individually connected by insulated electrical connections 31 to a control unit 32, which actuates the transducers and monitors their response to ultrasonic energy reflected from the plate 21. The control unit 32 detects the presence of a defect in the plate in a known manner.

The duct 29 carrying the transducers 30 is watertight. The electrical connections 31 between the transducers and their control unit pass from the duct 29 directly into the tube 25, which they leave at one open end outside the tank 10. Any water leaks into the duct 29 can be drained into the tube 25 through the passage provided for the electrical connections, and additional drain holes can also be provided. The tube itself is open at both ends to allow further drainage. The weight of the duct 29, transducers 30 and that part of the tube 25 within the tank, and the volume of the hollow spaces within the duct and tube, are such as to give the combination a substantially neutral buoyancy within the tank.

A number of advantages of the apparatus described derive from the fact that with neutral buoyancy there is no tendency for the beam carrying the transducers to distort under its own weight. The transducers will thus be more steadily supported, and the beam can be made more economically and to a lighter weight if additional rigidity does not have to be built into it. The momentum of the beam during reciprocation is lessened which allows a light drive mechanism and/or a faster reversal of the motion of the beams. The tank can be provided with supports for the beam for use when the tank is standing empty.

Reciprocation of the array of transducers during the testing of the plate increases the area of the plate that is scanned, thereby increasing the efficiency of the testing apparatus. In addition, where a plate is being tested for the presence of internal inclusions which will have been elongated during a previous rolling process, reciprocation reduces the chance that a very long and narrow inclusion will pass undetected.

The invention can be used in other manners than that specifically described above. Thus, it is possible to inspect a tube rather than a plate by aligning the tube lengthways over the slot and then rotating the tube until its whole circumference has passed over the slot.

The test piece can alternatively be passed through the water reservoir of a modified apparatus, the beam with its transducers being inverted if the test piece should be passed below the beam; this arrangement is more suited to a flexible test piece such as steel strip. If the test piece is passed through the water below the beam, the beam can be given positive buoyancy and floated on the surface of the water.

The apparatus has been described as stationary while the test piece is moved past it, but in some circumstances, e.g. where the test piece is difficult to move, the apparatus can be moved along a stationary test piece.

The beam and the transducers which it carries are desirably made streamlined in the direction of their reciprocating motion to avoid undue turbulence in the water and possible bubble formation which would interfere with the ultrasonic testing.

I claim:

1. Apparatus for ultrasonically testing a test piece utilising water as a coupling medium between ultrasonic transducers and a test piece moving relative to the testing apparatus along a predetermined pathway, which apparatus comprises guide means defining the pathway to be followed by the test piece, a reservoir for the water so arranged in relation to the pathway that the water can contact successive parts of the test piece to be tested, a beam in the reservoir mounted for axial reciprocation transversely of the pathway, and a plurality of ultrasonic transducers carried spaced along the beam operatively directed towards the pathway, the beam and the ultrasonic transducers carried thereon having in combination substantially neutral or positive buoyancy in water.

2. Apparatus as claimed in claim 1, in which the pathway is disposed outside the reservoir which is provided with an elongate outlet disposed transversely of the pathway, and the reservoir is further provided with means for the continuous supply to it of water, whereby a continuous flow of water emerging from the outlet can intersect the pathway and contact the test piece when it is moving along the pathway.

3. Apparatus as claimed in claim 1 in which the reservoir is situated beneath the pathway.

4. Apparatus as claimed in claim 1 in which the guide means defining the pathway comprises two successive rollers of a roller table.

5. Apparatus as claimed in claim 1 in which the beam extends through opposite walls of the reservoir.

6. Apparatus as claimed in claim 1 in which the beam and the transducers which it carries are streamlined in the direction of their reciprocating motion.

7. A method for ultrasonically testing a test piece, which method comprises moving the test piece relatively to a reservoir of water along a predetermined pathway whereby water from the reservoir contacts successive parts of the test piece to be tested, axially reciprocating in the reservoir a beam carrying a plurality of ultrasonic transducers spaced along the beam operatively directed towards the pathway, the beam and the ultrasonic transducers carried thereon having in combination substantially neutral or positive buoyancy in the water, and activating the ultrasonic transducers whereby to transmit ultrasonic energy to the test piece and receive ultrasonic energy reflected from the test piece through the water as a coupling medium.

8. A method as claimed in claim 7 in which the pathway is outside the reservoir, and the reservoir is continuously supplied with water which contacts the test piece moving along the pathway by continuously flowing through an elongate outlet disposed transversely of the pathway to intersect the pathway.

9. A method as claimed in claim 7 in which the transducers are carried on the beam in an array whose length is greater than the width of the test piece, and during axial reciprocation of the beam neither edge of the test piece over reaches either end of the array.

10. A method as claimed in claim 7 in which the test piece is a steel plate.

11. A method as claimed in claim 7 in which the test piece is passed through the water reservoir.

* * * * *